(12) United States Patent
Greene (10) Patent No.: US 10,715,413 B2
(45) Date of Patent: Jul. 14, 2020

(54) TIMESTAMP-BASED SESSION ASSOCIATION

(71) Applicant: Parrable Inc., New York, NY (US)

(72) Inventor: Justin E. Greene, New York, NY (US)

(73) Assignee: Parrable Inc., New York, NY (US)

( * ) Notice: Subject to any disclaimer, the term of this patent is extended or adjusted under 35 U.S.C. 154(b) by 374 days.

(21) Appl. No.: 15/469,162

(22) Filed: Mar. 24, 2017

(65) Prior Publication Data

US 2018/0278509 A1  Sep. 27, 2018

(51) Int. Cl.
   *G06F 15/173* (2006.01)
   *H04L 12/26* (2006.01)
   (Continued)

(52) U.S. Cl.
   CPC .......... *H04L 43/106* (2013.01); *H04L 67/146* (2013.01); *H04L 67/22* (2013.01);
   (Continued)

(58) Field of Classification Search
   None
   See application file for complete search history.

(56) References Cited

U.S. PATENT DOCUMENTS 6,615,262 B2    9/2003   Schweitzer et al.
8,478,856 B2 *  7/2013   Williams ........... H04N 21/2381
                                                709/223

(Continued)

FOREIGN PATENT DOCUMENTS

JP    2010-093556      4/2010
WO    WO 2017/053540   3/2017
WO    WO 2018/175342   9/2018

OTHER PUBLICATIONS

PCT Application PCT/US2016/053065 International Search Report and Written Opinion dated Dec. 6, 2016.

(Continued)

*Primary Examiner* — Dhairya A Patel
(74) *Attorney, Agent, or Firm* — Polsinelli LLP (57) ABSTRACT

Systems and methods for associating sessions using (TCP packet-level) timestamps are provided. A collection of data packets received during one or more sessions within a time period may be retrieved. Each packet in the collection may be associated with a unique identifier of a respective session. A skew for a selected session within the time period may be determined based on a rate difference between a respective receiving device clock and a respective sending device clock of at least two data packets associated with the unique identifier of the selected session. The selected session may be associated with a computing device. An uptime may be calculated for each of the retrieved data packets based on the determined skew and respective timestamp information of the data packet. It may be identified as to whether each of the calculated uptimes matches a previously calculated uptime for a packet associated with a previous session or a session that has previously been associated with a selected session. A list of sessions associated with the computing device may be updated based on one or more identified matches between the respective calculated uptime and the previously calculated uptime.

18 Claims, 3 Drawing Sheets

(51) Int. Cl.
*H04L 29/06* (2006.01)
*H04L 29/08* (2006.01)

(52) U.S. Cl.
CPC .............. *H04L 69/16* (2013.01); *H04L 67/02* (2013.01); *H04L 67/42* (2013.01)

(56) References Cited

U.S. PATENT DOCUMENTS

| | | | |
|---|---|---|---|
| 8,635,374 B1 * | 1/2014 | Pannell | H04L 43/0811 |
| | | | 709/249 |
| 9,003,009 B2 * | 4/2015 | Williams | H04L 7/0025 |
| | | | 709/223 |
| 9,003,540 B1 | 4/2015 | Johansson et al. | |
| 9,342,617 B1 | 5/2016 | Greene et al. | |
| 9,398,091 B2 * | 7/2016 | Williams | H04L 67/1095 |
| 9,420,324 B2 * | 8/2016 | Ravi | H04N 21/41407 |
| 9,602,366 B1 | 3/2017 | Manin | |
| 10,050,731 B1 * | 8/2018 | Martin | H04L 69/161 |
| 10,075,330 B1 * | 9/2018 | Pannell | H04L 41/0672 |
| 2003/0120789 A1 | 6/2003 | Hepworth et al. | |
| 2003/0152034 A1 | 8/2003 | Zhang et al. | |
| 2004/0111746 A1 * | 6/2004 | Hoang | H04L 29/06027 |
| | | | 725/54 |
| 2006/0233106 A1 * | 10/2006 | Achlioptas | H04L 45/745 |
| | | | 370/235 |
| 2008/0127209 A1 | 5/2008 | Gale et al. | |
| 2009/0006861 A1 | 1/2009 | Bemmel | |
| 2009/0116397 A1 * | 5/2009 | Denby | H04L 41/145 |
| | | | 370/252 |
| 2011/0320816 A1 * | 12/2011 | Yao | G06F 21/316 |
| | | | 713/171 |
| 2012/0250081 A1 | 10/2012 | Takahashi | |
| 2013/0124309 A1 | 5/2013 | Traashahl et al. | |
| 2014/0059267 A1 * | 2/2014 | Lai | G06F 13/4059 |
| | | | 710/313 |
| 2014/0149577 A1 | 5/2014 | Monighetti | |
| 2014/0257999 A1 | 9/2014 | Garcia-Martinez | |
| 2015/0074258 A1 | 3/2015 | Ferreira et al. | |
| 2015/0118991 A1 * | 4/2015 | Chung | H04M 15/08 |
| | | | 455/406 |
| 2015/0200863 A1 | 7/2015 | Wu | |
| 2016/0323565 A1 * | 11/2016 | van Baarsen | G06T 7/593 |
| 2017/0013070 A1 | 1/2017 | Comstsock et al. | |
| 2017/0013403 A1 * | 1/2017 | Sen | H04B 17/27 |
| 2017/0085522 A1 | 3/2017 | Greene | |
| 2017/0272465 A1 * | 9/2017 | Steele | H04L 63/101 |
| 2018/0098196 A1 * | 4/2018 | Dal Santo | H04L 67/02 |

OTHER PUBLICATIONS

PCT Application PCT/US2018/023177 International Search Report and Written Opinion dated May 25, 2018.
U.S. Appl. No. 14/861,993 Office Action dated Feb. 28, 2018.
U.S. Appl. No. 14/861,993 Office Action dated Jun. 13, 2017.
PCT Application PCT/US2018/023177 International Preliminary Report on Patentability dated Sep. 24, 2019.

* cited by examiner

TIMESTAMP-BASED SESSION ASSOCIATION

BACKGROUND

Field of the Invention

The present invention generally relates to websites and applications. More specifically, the present invention relates to timestamp-based session association (e.g., of the same device).

Description of the Related Art

The use of Internet and web resources is nearly ubiquitous throughout the industrialized world. Users generally access the Internet using any of a number of computing devices capable of communicating over a communication network, whether wirelessly or through wired connections. More specifically, the user may use an application (e.g., browser) on a computing device to access content on any of a number of webpages and websites hosted by one or more web and application servers. As used herein, references to browser and browser identifier are illustrative and should not be construed to exclude other types of applications. On the contrary, the present disclosure is applicable to and inclusive of a variety of applications.

Upon request, content related to a designated webpage may be downloaded to the user computing device, which may further render the webpage to be displayed. Such downloaded content may include a variety of different types of files, including documents, graphics, audio and video, etc., as well as related data (e.g., metadata, stylesheets including cascading stylesheets). The downloaded content may be stored in a browser cache in local memory of the computing device. Various elements and components of a particular webpage or website may change over time (e.g., as a publisher publishes new or updated content). Some components or elements, however, remain static and unchanged. When the user leaves the webpage and later wishes to return, the browser cache allows the computing device to retrieve static, unchanged files related to the associated webpage from local memory, rather than re-downloading the same web objects when a user wishes to revisit the webpage.

Currently, browsers do not contain or expose any unique identifiers that can be accessed and used by websites. Present websites and webpages may track and share data regarding the activity (e.g., repeat visits) of the user in relation to a particular webpage. Such data may include state information (e.g., preferences, shopping cart items), provide registration or authentication information (e.g., user names, passwords, addresses/locations), or otherwise track browsing history (e.g., which webpages were visited, a number of visits, when the visits occurred). Because nearly all aspects of modern life may be reflected in or otherwise involve Internet activity, however, some of the tracked data may be personally identifiable of a particular individual. Tracking mechanisms that encompass such personally identifiable data may therefore risk exposure of personal, confidential, and/or otherwise sensitive user information. In the interests of protecting user privacy, some jurisdictions may even have statutes or regulations restricting the type of data that may be tracked.

Meanwhile, various publishers, service providers, and related entities may be interested in obtaining statistical data regarding the user traffic that visits a given webpage or website. Although a web server may be able to identify a number of download requests for a particular webpage, such requests may be made by the same user (or the same small set of users). Such a metric may therefore fail to present an accurate picture of the traffic or user activity involving the website, while using the more particularized data discussed above may risk exposure of information that is personally identifiable of a specific user.

Moreover, users may use different applications and browsers and visit a variety of different websites and content providers. Such variety can complicate the ability to track traffic where, for example, a user may use different browsers or applications to access the same website. Further complications arise when multiple websites are considered. Because such different browsers generally do not communicate or exchange information, it can be quite difficult to get a full picture of how such a user may traffic the Internet.

There is, therefore, a need in the art for proved systems and methods for associating different sessions to a particular device.

SUMMARY OF THE CLAIMED INVENTION

Embodiments of the present invention allow for transmission control protocol (TCP) timestamp-based session association. A collection of data packets received during one or more TCP sessions within a time period may be retrieved. Each packet in the collection may be associated with a unique identifier of a respective session (i.e., the originating IP address and Port of the session). A skew for packets of a selected session within the time period may be determined based on a rate difference between a respective receiving device clock and a respective sending device clock of at least two data packets associated with the unique identifier of the selected session. The selected session may be associated with a computing device. An uptime may be calculated for each of the retrieved data packets based on the determined skew and respective timestamp information of each data packet. It may be identified as to whether each of the calculated uptimes matches a previously calculated uptime for a packet associated with a previous session or a session that has previously been associated with a selected session. A list of sessions associated with the computing device may be updated based on one or more identified matches between the respective calculated uptime and the previously calculated uptime.

Various embodiments may include methods for TCP timestamp-based session association. Such methods may include retrieving a collection of data packets received during one or more sessions within a time period where each packet is associated with a unique identifier of a respective session, determining a skew for packets of a selected session (which is associated with a computing device) based on a rate difference between a respective receiving device clock and a respective sending device clock of at least two data packets associated with the unique identifier of the selected session, calculating an uptime for each of the retrieved data packets based on the determined skew and respective timestamp information of the data packet, identifying whether each of the calculated uptimes matches a previously calculated uptime for a packet associated with a previous session or a session that has previously been associated with a selected session, and updating a list of sessions associated with the computing device based on one or more identified matches between the respective calculated uptime and the previously calculated uptime.

Additional embodiments may include server systems for timestamp-based session association. Such systems may include a processor that executes instructions to retrieve a collection of data packets received during one or more sessions within a time period where each packet is associated with a unique identifier of a respective session, to determine a skew for packets of a selected session based on a rate difference between a respective receiving device clock and a respective sending device clock of at least two data packets associated with the unique identifier of the selected session, to calculate an uptime for each of the retrieved data packets based on the determined skew and respective timestamp information of the data packet, and to identify whether each of the calculated uptimes matches a previously calculated uptime for a packet associated with a previous session or a session that has previously been associated with a selected session. Such systems may further include memory that stores a list of sessions associated with the computing device where the stored list of session may be updated based on one or more identified matches between the respective calculated uptime and the previously calculated uptime.

Further embodiments include non-transitory computer-readable storage media having embodied thereon a program executable by a processor to perform a method for timestamp-based session association as described above.

DETAILED DESCRIPTION

Embodiments of the present invention allow for timestamp-based session association. A collection of data packets received during one or more sessions within a time period may be retrieved. Each packet in the collection may be associated with a unique identifier of a respective session. (e.g., the client IP address and port of the session). A skew for a selected session within the time period may be determined based on a rate difference between a respective receiving device clock and a respective sending device clock of at least two data packets associated with the unique identifier of the selected session. The selected session may be associated with a computing device. An uptime may be calculated for each of the retrieved data packets based on the determined skew and respective timestamp information of the data packet. It may be identified as to whether each of the calculated uptimes matches a previously calculated uptime for a packet associated with a previous session or a session that has previously been associated with a selected session. A list of sessions associated with the computing device may be updated based on one or more identified matches between the respective calculated uptime and the previously calculated uptime.

Figure 1:
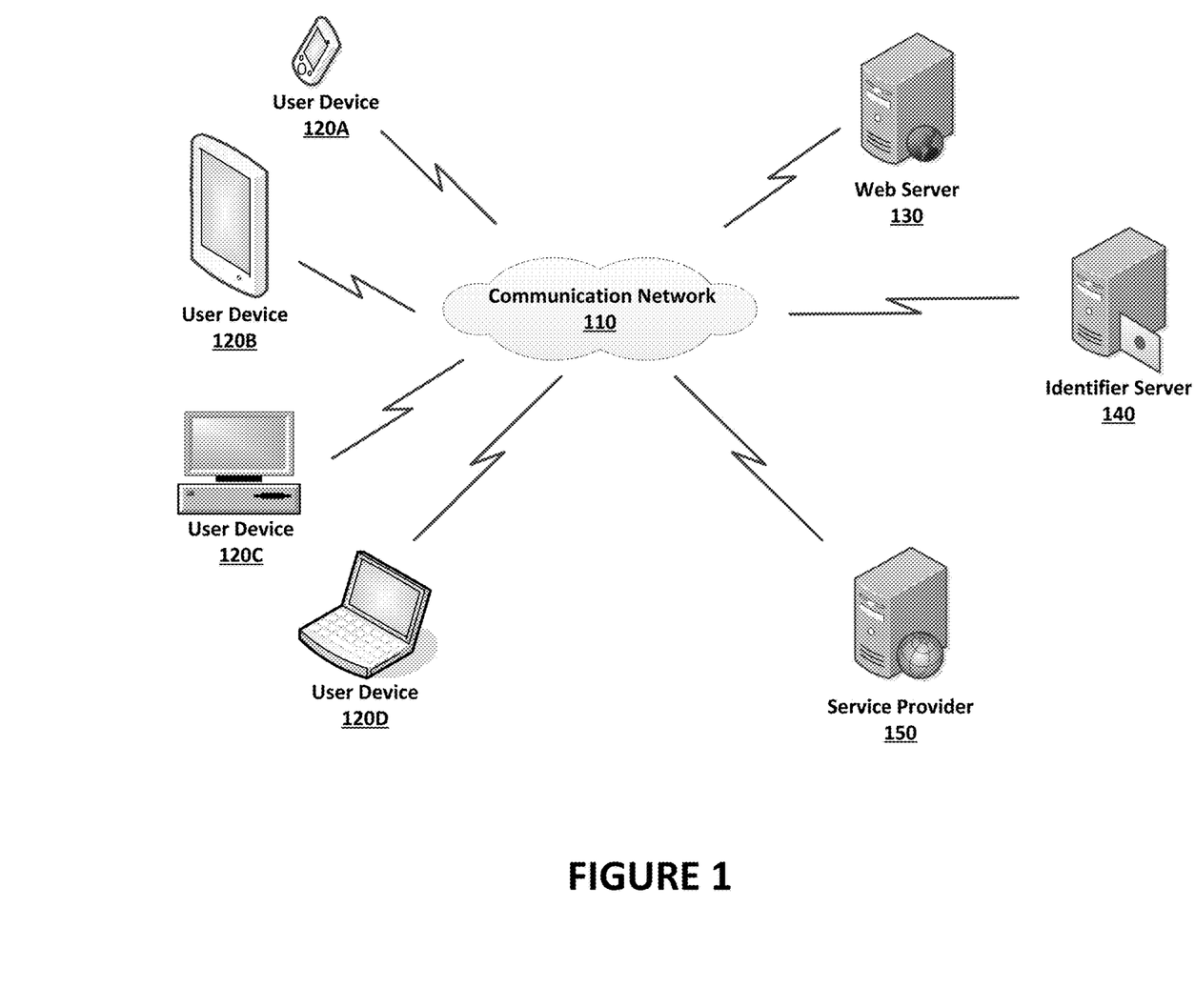
FIG. 1 illustrates an exemplary network environment in which a system for timestamp-based session association may be implemented.

FIG. 1 illustrates a network environment 100 in which a system for timestamp-based analysis of identifiers may be implemented. Network environment 100 may include a communication network 110, one or more user devices 120A-D, server 130, identifier server 140, and one or more service providers 150. Devices in network environment 100 may communicate with each other via communications network 110.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, cellular or mobile service providers, a cable service provider, a provider of digital subscriber line (DSL) services, or a satellite service provider. Communications network 110 allows for communication between the various components of network environment 100.

Users may use any number of different electronic user devices 120A-D, such as general purpose computers, mobile phones, smartphones, smartwatches, wearable devices, personal digital assistants (PDAs), portable computing devices (e.g., laptop, netbook, tablets), desktop computing devices, handheld computing device, or any other type of computing device capable of communicating over communication network 110. User devices 120 may also be configured to access data from other storage media, such as local caches, memory cards, or disk drives as may be appropriate in the case of downloaded services. User device 120 may include standard hardware computing components such as network and media interfaces, non-transitory computer-readable storage (memory), and processors for executing instructions that may be stored in memory.

In addition, user devices 120 may include a variety of applications, including browser applications that allow the user to request certain webpages and other network accessible data. As used herein, references to browser and browser identifier are exemplary, and teachings regarding the same are applicable to other types of applications and application identifiers (e.g., Apple IDFA, Google AdID). For example, a user may enter a uniform resource locator (URL) into a browser application. Such a browser may send such request to an associated web server (e.g., server 130), receive responsive data (e.g., webpage file with references to other files to download), and use such responsive data to render and display the requested webpage. Webpage files that may be downloaded to the user device 120 may include not only files corresponding to content that is actually displayed as part of the webpage, but also associated files.

Server 130, identifier server 140, and service providers 150 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may be any kind of server used to host web content, including any type of webpage or website data. The particular files associated with each website may be controlled by a publisher (or designated administrator). The website file may include links to files under control by other parties. In that regard, the website files downloaded from server 130 may include a reference (e.g., URL) to an identifier file, as well as an optional loader application (e.g., Javascript commands) and associated code library to be used with the identifier file. Such identifier file may be specific to the website. For example, an identifier for a particular website may include or otherwise be based on a domain (or other characteristic) of that website. As such, each website visited by a particular user device using a particular browser (or other application) may be associated with a unique and different identifier.

Such identifier may be generated and managed in manners similar to those disclosed with respect to the browser identifiers disclosed in related co-pending U.S. patent application Ser. No. 14/716,187, the disclosure of which is incorporated by reference herein. Moreover, the browser identifiers disclosed herein may be used in conjunction with the disclosed invention of related U.S. patent application Ser. No. 14/716,187. A browser identifier may be associated with different browser sessions on a device. Because different browser and different browser sessions may be used on the same device, various indicators (e.g., timestamp) may be used to associate such different browsers and sessions to a common device. Further, each session may likewise be associated with certain identifiers, including TLS session identifier, TLS session ticket, etc., as discussed below.

The identifier server 140 may further be able to draw associations between the various identifiers (e.g., session identifiers, browser identifiers, device identifiers). In this regard, a particular user device 120 (as identified by a device identifier) may be associated with one or more sessions and browsers (or other applications). The identifier server 140 may therefore be capable of identifying one or more such identifiers (whether website, browser, session, or device) based on examination of received data packets. The identifier server 140 may store associations between various indicators by creating and updating tables. For example, secure sessions (e.g., secure socket layer (SSL) sessions) may allow for session resumption, which occurs where a client and server negotiates SSL information and then later reuses that negotiated SSL information for future connections. SSL session setup is generally very time-consuming, so not having to renegotiate is therefore desirable. In order to resume a session, a client must be able to identify the session. SSL session IDs and TLS session tickets are two mechanisms that allow for the identification and resumption of a previously selected session.

Additional indicators may be based on use of transmission control protocol (TCP) information. TCP is used by a variety of Internet-based applications, including web browsers, email, and other applications. Information associated with use of TCP by a particular device (e.g., present in a TCP packet) may be inclusive or indicative of various timestamp information. Other time-related information may be associated with a TCP packet, including current time, uptime, and clock skew. In an exemplary embodiment, the identifier server 140 may receive a packet (e.g., associated with TCP timestamp information, such as a particular current time, uptime, source IP address, clock skew) of a selected session, determine whether the associated timestamp information (e.g., uptime) of a packet matches any timestamp information of a previously received packet that may be associated with a selected session, and if so, drawing an association between the sessions. Further, a stored packet list may be maintained with associated identifiers or other indicators that may be used to make associations among different identifiers (e.g., different device identifiers for the same device).

While client timestamp is generally included in the TCP packet and server timestamp is generally added automatically when the TCP packet is received by the server, further calculations may also be applied to determine other timestamp related information (e.g., uptime and clock skew). The client timestamp, for example, provides a measure of time typically reflective of the elapsed time since a computing device was started and continuously working. Especially when combined with other indicators (e.g., clock skew), the calculated uptime (when the device was last started) may be able to uniquely identify a particular device as all packets for that device received within some window of time of each other would share the same calculated uptime. With respect to client timestamp, a device may record and report an elapsed time since the last time the device was started or the elapsed time was reset. That elapsed time may reset based on different schedules for different computing devices (e.g., some devices reset every few days and others reset every few weeks). Elapsed time may increment with a different granularity for different devices and operating systems. The granularity of the increment is measured in ticks. A tick may also represent a different amount of time for different systems, so there may be some device-specific calculations involved to determine type of device by determining the amount of time represented by a tick. The result is a timestamp that is incrementing consistently in real time. Calculating that backwards provides the uptime, which may be the time the device was last started or the last time the timestamp was reset. As such, the uptime generally remains the same even elapsed time increases, until such time that the timestamp is reset.

Such indicators used by identifier server 140 may therefore include session identifiers (e.g., transport layer security (TLS), secure sockets layer (SSL)), transmission control protocol (TCP) identifiers (e.g., uptime, current time, clock skew), internet protocol (IP) address, user agent identifiers, and others. Such indicators may be used individually or in any combination (e.g., SSL session identifier and TCP timestamp) to identify a particular common browser and/or a particular user device 120 based on common matches. An exemplary embodiment may select a certain set of indicators based on their respective deterministic value in identifying connections between identifiers for different browsers or devices. For example, a SSL session identifier is unique to a collection of one or more sessions and can therefore be used to associate different browser identifiers for the same browser together. Likewise, the combination of current time, uptime, clock skew, and source IP address is unique to a particular device, thereby allowing for connections to be drawn between different identifiers associated with the device.

For example, a particular request to download website may refer to an identifier that is associated with one or more indicators (e.g., SSL session identifier). Such SSL session identifier may be compared to stored information and determined by identifier server 140 as having been previously used in conjunction with the same or different browser identifier and/or device identifier. Likewise, an uptime associated with the requesting computing device may be determined by identifier server 140 as having been previously identified or used in conjunction with the same or other browser identifiers and/or device identifiers.

Information regarding identifiers may be stored in a table, which may further include a list of identifiers determined to be associated with the same browser, application, session, or device. Where no stored table existed for the referenced identifier (or any of its associated indicators or identifiers), a new table may be created. Where a stored table does exist, such stored table may be updated. As such, tables having one or more of these identifiers may be created and updated based on newly incoming identifiers (associated with certain indicators) and matches with stored identifiers (associated with the same or different indicators). When the identifier server 140 finds that two different identifiers have the same indicator (e.g., SSL session identifier), for example, the identifier server 140 may determine that the respective sessions are originating from the same device. The lifespans, availability, and uniqueness of each indicator may vary across different browsers, user agents, and/or operating systems. As such, indicators may be used in combination to exclude certain devices, for example, thereby facilitating the search for a match.

In some embodiments, a first party cookie may be used as the persistent identifier for each website. Although a cookie may persist for a time, such cookie may be changed periodically. Thereafter, various matching parameters (e.g., SSL and uptime) may be used to identify and to draw associated cookies together as described in further detail below. In that regard, the identifier server 140 should be understood as having the ability to use any persistent identifier to associate to other persistent identifiers. Over time, therefore, the tables constructed by the identifier server 140 may grow to identify new connections and associations between various identifiers.

Service providers 150 may include servers or other computing devices that may provide various services based on identification of a browser. For example, a service provider 140 may use information regarding repeat visits to provide targeted advertising to repeat visitors (versus first-time visitors).

Figure 2:
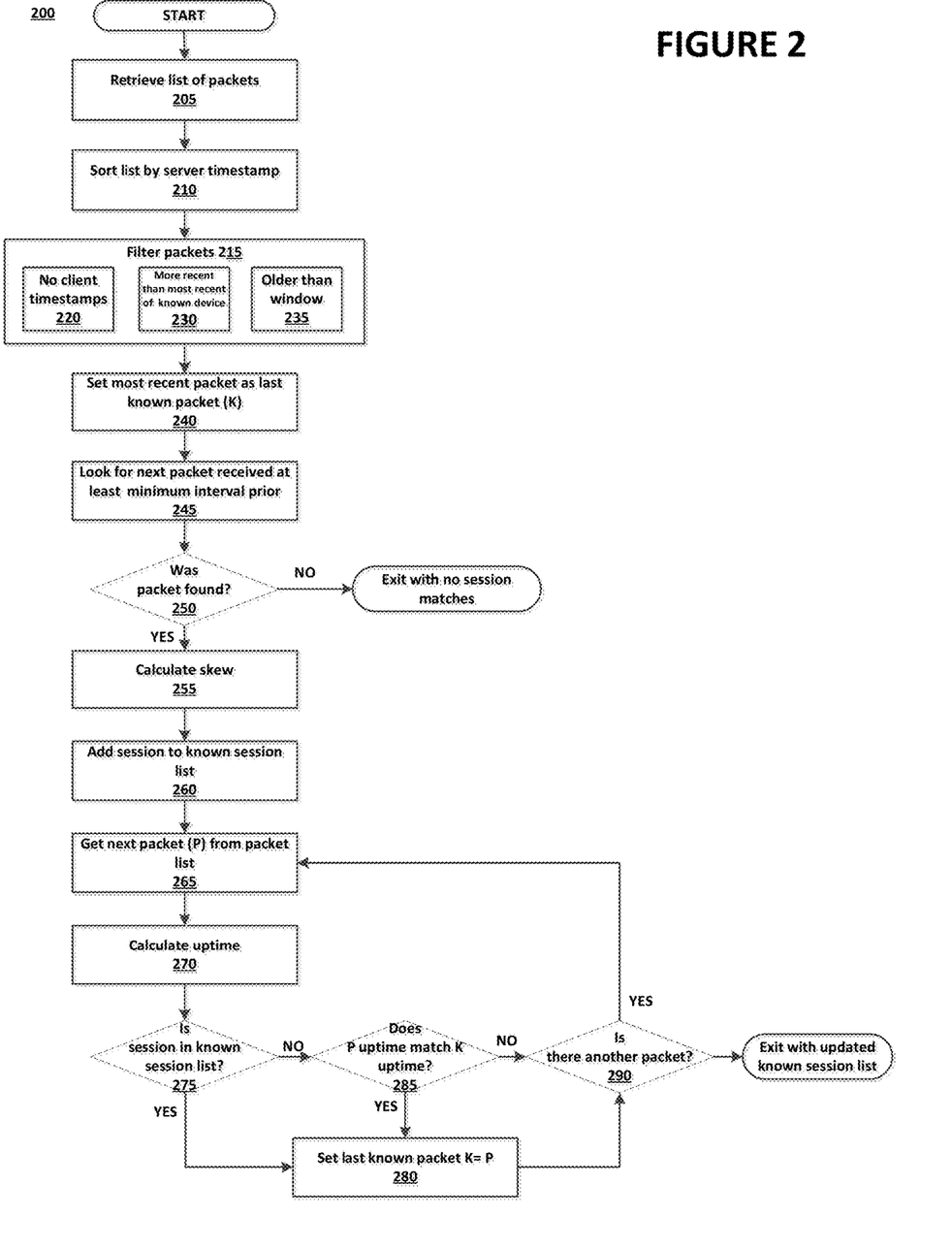
FIG. 2 is a flowchart illustrating a method for timestamp-based session association.

FIG. 2 is a flowchart illustrating an exemplary method 200 for timestamp-based session association. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

Method 200 may be used to allow for timestamp-based session association despite various network anomalies and inconsistencies that may occur over time. When network jitter is present, data packets sent from the same device 120 may experience variations in timestamp data. Timestamp-based metrics—including skew—may therefore seem to vary. To compensate for such irregularities, method 200 may evaluate packets that are received over time. Such packets may be associated with a unique identifier for a session of a device 120. Identifying uptime matches may then allow for identification that multiple sessions belong to the same device 120 (e.g., based on common uptime s) despite being associated with different device identifiers, browser identifiers, TLS Session IDs, user agents, etc. Although the steps are illustrated and described in sequence, some steps may be performed concurrently or in a different order.

In step 205, data packets may be retrieved from a data store for a predefined window of time (e.g., 24 hours). Data packets may be sent from one or more of the user devices 120A-D operating a network-enabled application, such as a browser, and are received and captured at identifier server 140. Over the course of the predefined window of time, further, data packets associated with different sessions may have been received. Each data packet may include various identifiers, including IP address, port, computing device timestamp, server timestamp, device identifier, browser identifier, user agent, operating system and version, session information (start time) and other information. The period of time during which the data packets are captured may be configurable.

In step 210, the retrieved data packets may be sorted by time of receipt (e.g., from most recently received to oldest) as indicated by the server timestamp.

In step 215, the set of packets being evaluated may be filtered based on various factors, including session, device of origin, time of receipt (e.g., last 24 hours), etc. Data packets not meeting the parameters of interest may be discarded from further evaluation. For example, in step 220, data packets may be filtered out based on not having any timestamp information. Further, the set of packets may be refined based on time of receipt in steps 230 (too recent) and 235 (too old).

In some embodiments, packets may also be discarded from evaluation for being outliers. Further, anomalies may arise when a computing device goes into sleep mode during which the clock may run much more slowly. Outlier packets may be identified based on falling into a predetermined percentile (e.g., 95th percentile) with respect to difference between computing device timestamps and server timestamps. If the difference is much larger than expected (e.g., 95th percentile), for example, the packet may not be selected for inclusion in calculations and comparisons.

After the list of packets has been filtered, two packets are selected for analysis with respect to skew. Because network latency may not be constant, selecting different sets of packets may result in different skew values due to variations in when the server receives a packet (which results in variable differences between computing device timestamp and server timestamps). The selected packets may be the most recently received packet and the next most recently received packet that was received at least a predetermined time period (e.g., at least one second) from receipt of the most recently received packet. In other implementations, the most recently received packet and the oldest received packet may be selected.

In step 240, the most recently received packet in the retrieved list is set as the last known packet. In step 245, the next most recently received packet may be searched for that was received at least a predetermined minimum of time (e.g., at least one second later) from receipt of the last known packet. In step 250, it may be determined whether the next packet was found. If not, the method exits without any device matches. If the next packet was found, the method process to step 255.

In step 255, a skew may be calculated. To calculate the skew, the data packets received from the same session or identifier may be further analyzed together (e.g., two data packets received at least a predetermined time interval apart). Each data packet is associated with a computing device (client) timestamp and a server timestamp. The computing device timestamp is placed in the packet by the computing device 120 under TCP protocol. The computing device timestamp represents an amount of time since the computing device was restarted (or the timestamp reached is maximum value and rolled over). The server timestamp is the actual time that the packet was received according to the server clock. Both the server timestamp and the computing device timestamp advance in real time.

As described, skew may represent the speed at which a client (e.g., computing device) clock is incrementing in comparison to a server clock. As such, a skew value may be a difference in the rate of advance of the client timestamp and the server timestamp, which may be due to differences in CPU architecture, clock speed, and other differences between the client and the server. Skew may be calculated as follows:

$$skew=(p1.s\_ts-p2.s\_ts)/(p1.c\_ts-p2.c\_ts)$$

where p1.s_ts is the server timestamp of a first selected data packet (e.g., most recently received within time window), p.2s_ts is the server timestamp of the second selected data packet (e.g., received at least a predetermined time before the first packet), p1.c_ts is the computing device timestamp of the first packet, and p2.c_ts is the computing device timestamp of the second data packet.

In step 260, the session identifier associated with the last known packet may be added to the known session list, and in step 265, the next packet in the retrieved list may be evaluated.

In step 270, an uptime may be calculated for each packet. As described, uptime represents an amount of time since the client (e.g., computing device) timestamp was at zero. Such uptime may be calculated as follows:

$$uptime=s\_ts-(c\_ts*skew)$$

where skew is calculated as discussed above with respect in step 255. Following performance of step 270, each data packet being evaluated may be associated with an uptime. In some embodiments, the first packet in the set (e.g., where there is no previously received packet) may simply be assigned the first uptime. Further, in some implementations, skew may be calculated for different sets of packets and then averaged for use in calculating uptime.

In step 275, it may be determined whether the session identifier associated with the next packet is found in the known session list. If yes, the method proceeds to step 280, in which the next packet is designated the last known packet. If the session identifier associated with the next packet is not found in the known session list, the method proceeds to step 285, in which it may be determined whether the uptime of the next packet matches the uptime of the last known packet. A match may be found when two uptime values are within a predefined range. As such, minor variations may nevertheless result in a match. A match indicates that the associated data packets likely originated from the same device. If an uptime match is found, the method proceeds to step 280, in which the next packet is designated the last known packet. From step 280 and where the uptimes do not match, the method proceeds to step 290, in which it may be determined whether there is another packet in the retrieved list. If yes, the method reverts back to step 265, in which another next packet in the list may be obtained for evaluation. If there is no other packet in the list, the method may exit with an updated known session list, which may be used to update various databases with respect to the newly determined matches between different session identifiers. Such updates may include merging of various fields (e.g., in stored table) to include information regarding the data packets having a uptime matching a primary uptime associated with the stored table, which may be associated with a device identifier. As such, multiple identifiers may be determined to be associated with the same device, and information regarding the different identifiers may be incorporate or otherwise merged into a combined record that corresponds to a common device.

A primary uptime may be designated. Where multiple uptimes have been calculated for a device (as identified by one or more device identifiers), one uptime may be selected to be designated as the primary uptime for the table. For example, the most recently calculated uptime associated with the device may be designated as the primary uptime, which may then be used for comparison with subsequently calculated uptimes. As such, the primary uptime associated with a specific device may be maintained and updated as necessary in light of network anomalies and jitter effects.

The method 200 may be iterated
k=n (set the known packet as the first packet)
sessionList.push(packet(k).sessionid)
n=n+1 (increment the packet index)
while n<packetList.length (there are more packets to process)
  if packet(n).sessionid is in sessionList
  k=n (make this our last known packet)
  else
  if packet(n).uptime matches* packet(k).uptime
    k=n (make this our last known packet)
    append packet(n).deviceid to sessionList (remember device)
    n=n+1 (increment the packet index)
where n is the index of the packet in the array, k is the index of the last packet for the known device, sessionList is a list of all session that have been determined to be the same device as the initial known session (including the initial known session to start), and matches refers to values that are within a predetermined, configurable time period.

Figure 3:
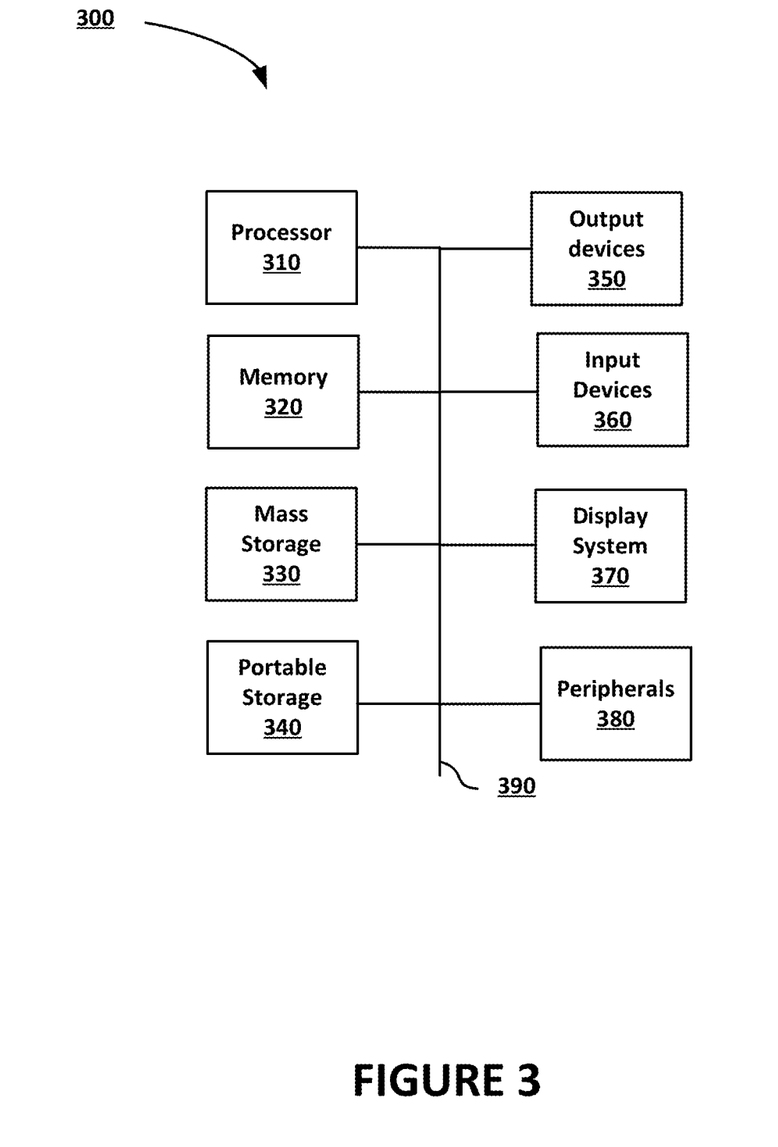
FIG. 3 illustrates an exemplary computing system that may be used to implement an embodiment of the present invention.

FIG. 3 illustrates an exemplary computing system 300 that may be used to implement an embodiment of the present invention. System 300 of FIG. 3 may be implemented in the contexts of the likes of user devices 120A-D, server 130, identifier server 140, and service provider 150. The computing system 300 of FIG. 3 includes one or more processors 310 and memory 310. Main memory 310 stores, in part, instructions and data for execution by processor 310. Main memory 310 can store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. However, the components may be connected through one or more data transport means. For example, processor unit 310 and main memory 310 may be connected via a local microprocessor bus 390, and the mass storage device 330, peripheral device(s) 380, portable storage device 340, and display system 370 may be connected via one or more input/output (I/O) buses 390.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 310.

Portable storage device 340 operates in conjunction with a portable non-volatile storage medium, such as a floppy disk, compact disk (CD) or digital video disc (DVD), to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. For example, peripheral device(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus (e.g., bus 390) carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for associating sessions based on timestamp data, the method comprising:

retrieving a collection of data packets received during one or more sessions within a time period, each packet in the collection of data packets associated with a unique identifier of a respective session;

determining a skew for packets of a session selected from the sessions within the time period, the determined skew based on a rate difference between a respective receiving device clock and a respective sending device clock of at least two data packets associated with the unique identifier of the selected session, wherein the selected session is associated with a client device;

calculating an uptime for each of the retrieved data packets, wherein the calculated uptime is indicative of a last time that a respective timestamp of a respective one of the data packets was reset, the respective timestamp for each data packet including a timestamp from the client device and a timestamp from a server, the uptime calculated by multiplying the determined skew to the client device timestamp and subtracting the product from the server timestamp;

identifying whether each of the calculated uptimes matches a previously calculated uptime for a packet associated with a previously selected session; and updating a list of sessions associated with the client device based on one or more identified matches between the respective calculated uptime and the previously calculated uptime.

2. The method of claim 1, wherein the sessions are TCP sessions.

3. The method of claim 2, further comprising:

identifying one of the retrieved packets as most recently received within the time period for the selected session; and identifying the selected session based on the identified packet being associated with the unique identifier of the selected session.

4. The method of claim 1, further comprising filtering the retrieved data packets based on the IP address.

5. The method of claim 1, further comprising discarding at least one outlying data packet.

6. The method of claim 5, wherein the outlying data packet is identified based on falling into a selected percentile in relation to other data packets associated with the collection based on respective timestamp data.

7. The method of claim 1, further comprising discarding at least one data packet when the at least one data packet is not associated with timestamp data.

8. The method of claim 1, wherein determining the skew comprises:

selecting the at least two data packets for skew determination, wherein the two data packets include a first data packet that was most recently received within the time period from the selected session and a second data packet that was received prior by a predetermined time interval for the selected session; and calculating the skew based on the client device timestamp and the server timestamps of the first data packet and the client device timestamp and the server timestamps of the second data packet.

9. The method of claim 8, wherein calculating the skew comprises:
    determining a difference between the server timestamp of the first data packet and the server timestamp of the second data packet;
    determining a difference between the client device timestamp of the first data packet and the client device timestamp of the second data packet; and
    dividing the server timestamp difference by the client device difference.

10. The method of claim 1, wherein the respective calculated uptime is deemed to match the previously calculated uptime when the respective calculated uptime is within a predetermined range of the previously calculated uptime.

11. The method of claim 1, wherein a session on the client device is associated with an identifier.

12. The method of claim 11, wherein sessions with the same identifier are treated as a single session.

13. The method of claim 11, wherein the updated list of sessions is treated as a single session during comparison to subsequent sessions.

14. The method of claim 1, wherein the respective timestamp was last reset when the client device was restarted.

15. The method of claim 1, wherein the client device is associated with one or more unique device identifiers, and wherein the list of sessions further includes one of the device identifiers in association with each of the listed sessions.

16. The method of claim 1, wherein the client device is associated with one or more unique browser identifiers of browsers used by the client device, and wherein the list of sessions further includes one of the browser identifiers in association with each of the listed sessions.

17. A server system for associating sessions based on timestamp data, the system comprising:
    a processor that executes instructions stored in memory, wherein execution of the instructions by the processor:
        retrieves a collection of data packets received during one or more sessions within a time period, each packet in the collection of data packets associated with a unique identifier of a respective session,
        determines a skew for packets of a session selected from the sessions within the time period, the determined skew based on a rate difference between a respective receiving device clock and a respective sending device clock of at least two data packets associated with the unique identifier of the selected session, wherein the selected session is associated with a client device,
        calculates an uptime for each of the retrieved data packets, wherein the calculated uptime is indicative of a last time that a respective timestamp of a respective one of the data packets was reset, the respective timestamp for each data packet including a timestamp from the client device and a timestamp from a server, the uptime calculated by multiplying the determined skew to the client device timestamp and subtracting the product from the server timestamp;
        identifies whether each of the calculated uptimes matches a previously calculated uptime for a packet associated with a selected session previous matched session; and
    memory that stores a list of sessions associated with the client device, wherein the stored list of session is updated based on one or more identified matches between the respective calculated uptime and the previously calculated uptime.

18. A non-transitory computer-readable storage medium, having embodied thereon a program executable by a processor to perform a method for associating sessions based on timestamp data, the method comprising:
    retrieving a collection of data packets received during one or more sessions within a time period, each packet in the collection of data packets associated with a unique identifier of a respective session;
    determining a skew for packets of a session selected from the sessions within the time period, the determined skew based on a rate difference between a respective receiving device clock and a respective sending device clock of at least two data packets associated with the unique identifier of the selected session, wherein the selected session is associated with a client device;
    calculating an uptime for each of the retrieved data packets, wherein the calculated uptime is indicative of a last time that a respective timestamp of a respective one of the data packets was reset, the respective timestamp for each data packet including a timestamp from the client device and a timestamp from a server, the uptime calculated by multiplying the determined skew to the client device timestamp and subtracting the product from the server timestamp;
    identifying whether each of the calculated uptimes matches a previously calculated uptime for a packet associated with a previous session; and
    updating a list of sessions associated with the client device based on one or more identified matches between the respective calculated uptime and the previously calculated uptime.

* * * * *